United States Patent
Liu (10) Patent No.: US 11,587,533 B2
(45) Date of Patent: Feb. 21, 2023

(54) METHOD FOR DISPLAYING POINT OF INFORMATION OF MAP, DEVICE, AND READABLE STORAGE MEDIUM

(71) Applicant: BEIJING BAIDU NETCOM SCIENCE AND TECHNOLOGY CO., LTD., Beijing (CN)

(72) Inventor: Wei Liu, Beijing (CN)

(73) Assignee: BEIJNG BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/223,837

(22) Filed: Apr. 6, 2021

(65) Prior Publication Data

US 2021/0225332 A1     Jul. 22, 2021

(30) Foreign Application Priority Data

Sep. 2, 2020   (CN) .......................... 202010910135.7

(51) Int. Cl.
  *G09G 5/38*      (2006.01)
  *G01C 21/00*     (2006.01)
(52) U.S. Cl.
  CPC .......... *G09G 5/38* (2013.01); *G01C 21/3811* (2020.08); *G09G 2340/045* (2013.01); *G09G 2340/0464* (2013.01); *G09G 2340/14* (2013.01)
(58) Field of Classification Search
  CPC ..... G09G 5/38; G01C 21/3811; G01C 21/367
  See application file for complete search history.

(56) References Cited

U.S. PATENT DOCUMENTS 9,443,494 B1 * 9/2016 Parish .................. G09G 5/373
2009/0089694 A1 * 4/2009 Mori ....................... A63F 13/52
 715/764

(Continued)

FOREIGN PATENT DOCUMENTS

JP    2016035414 A    3/2016
JP    2017181908 A    10/2017

(Continued)

OTHER PUBLICATIONS

Extended European Search Report issued in corresponding EP Application No. 21167099.7 dated Oct. 11, 2021 (10 pages).

(Continued)

*Primary Examiner* — Samantha (Yuehan) Wang
(74) *Attorney, Agent, or Firm* — Osha Bergman Watanabe & Burton LLP (57) ABSTRACT

The disclosure discloses a method for displaying a point of information of a map, a device, and a storage medium. The detailed implementation includes: obtaining a display position of a target point of information (POI) to be displayed; on a target electronic map displayed at a preset scale, determining a position relationship between the display position of the target POI and an influence region of each POI located in the target electronic map; and displaying information of the target POI at the display position of the target electronic map in response to the display position of the target POI being located outside the influence region of each POI in the target electronic map. With the technical solution of the disclosure, when the POI is displayed, the display efficiency and the intelligence degree are improved, the POI overlapping with its surrounding POIs is improved, and the overall display effect is ensured.

14 Claims, 3 Drawing Sheets

(56) References Cited

U.S. PATENT DOCUMENTS

2013/0321466 A1    12/2013  Kocienda
2020/0294091 A1*   9/2020   Pan .................. G06Q 50/01

FOREIGN PATENT DOCUMENTS

WO    2009016736 A1    2/2009
WO    2013111440 A1    8/2013
WO    2016124986 A1    8/2016
WO    2019196607 A1    10/2019

OTHER PUBLICATIONS

Office Action issued in Japanese Application No. 2021-111219, dated Aug. 9, 2022 (6 pages).
Office Action issued in Korean Application No. 10-2021-0108648, dated Nov. 23, 2022 (17 Pages).

* cited by examiner

METHOD FOR DISPLAYING POINT OF INFORMATION OF MAP, DEVICE, AND READABLE STORAGE MEDIUM

CROSS REFERENCE TO RELATED APPLICATION

This application is based on and claims priority to Chinese patent application No. 202010910135.7, filed on Sep. 2, 2020, the entire content of which is hereby introduced into this application as a reference.

FIELD

The disclosure relates to a field of intelligent transportation and electronic map technologies, and particularly relates to a method for displaying a point of information of a map, a device, and a readable storage medium.

BACKGROUND

On an electronic map, a map POI (point of information) may represent a shop, a bus stop or a road.

The POIs displayed on the electronic map may be different when the electronic map is displayed at different scales. The smaller the scale, the more the number of POIs displayed, and the richer types of the POIs. In the related art, when the POIs are updated, all of the updated POIs are rearranged and displayed on the electronic map displayed at various scales.

SUMMARY

Embodiments of the disclosure provide a method and an apparatus for displaying a point of information of a map, a device, and a readable storage medium.

In a first aspect, embodiments of the disclosure provide a method for displaying a point of information of a map. The method includes: obtaining a display position of a target point of information (POI) to be displayed; on a target electronic map displayed at a preset scale, determining a position relationship between the display position of the target POI and an influence region of each POI located on the target electronic map; and displaying information of the target POI at the display position of the target electronic map in response to the display position of the target POI being located outside the influence region of each POI on the target electronic map.

In a second aspect, embodiments of the disclosure provide an electronic device. The electronic device includes: at least one processor and a memory. The memory is communicatively coupled to the at least one processor. The memory is configured to store instructions executable by the at least one processor. The at least one processor is configured to: obtain a display position of a target point of information (POI) to be displayed; on a target electronic map displayed at a preset scale, determine a position relationship between the display position of the target POI and an influence region of each POI located in the target electronic map; and display information of the target POI at the display position of the target electronic map in response to the display position of the target POI being located outside the influence region of each POI in the target electronic map.

In a third aspect, embodiments of the disclosure provide a non-transitory computer readable storage medium having computer instructions stored thereon. The computer instructions are configured to cause a computer to execute a method for displaying a point of information of a map, and the method comprises:

obtaining a display position of a target point of information (POI) to be displayed;

on a target electronic map displayed at a preset scale, determining a position relationship between the display position of the target POI and an influence region of each POI located in the target electronic map; and displaying information of the target POI at the display position of the target electronic map in response to the display position of the target POI being located outside the influence region of each POI in the target electronic map.

It should be understood that, the contents described in the Summary are not intended to identify key or important features of embodiments of the disclosure, nor is it intended to limit the scope of the disclosure. Other features of the disclosure will become apparent from the following description.

BRIEF DESCRIPTION OF THE DRAWINGS

The accompanying drawings are used for better understanding the solution and do not constitute a limitation of the disclosure.

DETAILED DESCRIPTION

Description will be made below to exemplary embodiments of the disclosure with reference to accompanying drawings, which includes various details of embodiments of the disclosure to facilitate understanding and should be regarded as merely examples. Therefore, it should be recognized by the skilled in the art that various changes and modifications may be made to the embodiments described herein without departing from the scope and spirit of the disclosure. Meanwhile, for clarity and conciseness, descriptions for well-known functions and structures are omitted in the following description.

Figure 1:
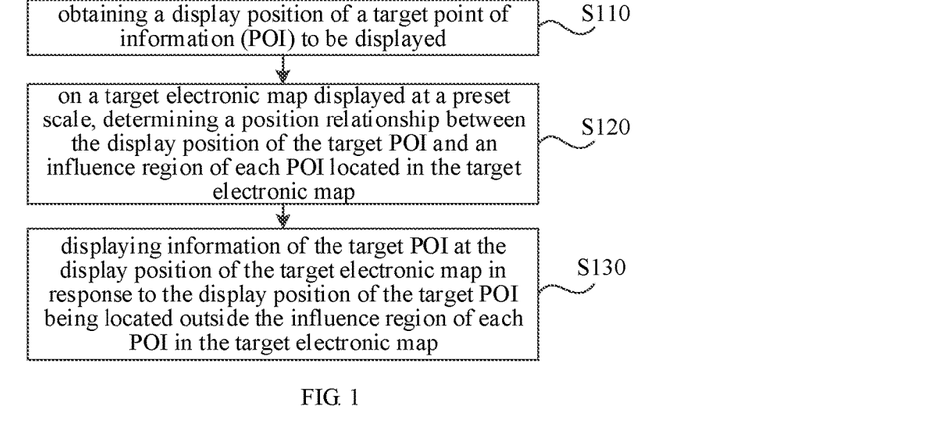
FIG. 1 is a flow chart illustrating a method for displaying a point of information of a map according to a first embodiment of the disclosure.

According to embodiments of the disclosure, FIG. 1 is a flow chart illustrating a method for displaying a point of information of a map according to a first embodiment of the disclosure. Embodiments of the disclosure are suitable for a condition where a newly added or updated POI displays on an electronic map. The method is executed by an apparatus for displaying a point of information of a map. The apparatus is implemented by software and/or hardware, and is specifically configured in an electronic device with a certain data operation ability.

The method for displaying the point of information of the map illustrated in FIG. 1 includes the followings.

At block S110, a display position of a target point of information (POI) to be displayed is obtained.

In embodiments of the disclosure, the POI to be displayed is a newly added POI or a POI updated from a historical POI. For convenience of description and distinction, the POI to be displayed is called the target POI. The display position of the target POI is a position on the electronic map, which may be expressed by a latitude and a longitude.

In some embodiments, the display position of the target POI is obtained based on a position where the target POI is located in a real scene.

At block S120, on a target electronic map displayed at a preset scale, a position relationship between the display position of the target POI and an influence region of each POI located on the target electronic map is determined.

The electronic map may be displayed at different scales, such as a scale of 1 m:500 m, or a scale of 1 m:5000 m. A preset scale may be any scale suitable for the electronic map to display. For convenience of description and distinction, the electronic map displayed at the preset scale is called the target electronic map. Electronic maps displayed at different scales may display different POIs. For example, when the electronic map is displayed at the scale of 1:500, communities and shops are displayed, and when the electronic map is displayed at the scale of 1:5000, villages and towns that occupy a larger area are displayed.

In embodiments, an influence region with a certain range is defined for each POI on the target electronic map. The influence region is actually a region occupied by the POI in visual effect, whose area may be larger than an actual area occupied by the POI. The influence region of the POI is not allowed other POIs to display inside, thereby decreasing a negatively influence, such as covering or colliding, on the POI in visual effect. In other words, considering having influence on surrounding POIs in visual effect, the influence regions of respective POIs may not overlap or partially overlap. The display position of the target POI may be outside the influence region of each POI or within the influence region of at least one POI.

At block S130, information of the target POI is displayed at the display position of the target electronic map in response to the display position of the target POI being located outside the influence region of each POI on the target electronic map.

When the display position of the target POI is located outside the influence region of each POI on the target electronic map, it is explained that the target POI may not negatively influence, such as cover or collide, on currently displayed POIs, and may be displayed normally. In detail, the information of the target POI is displayed at a display position of a base map of the target electronic map. In some embodiments, the information of the target POI includes, but is not limited to, a name, an icon and an introduction of the target POI.

In some embodiments, after the information of the target POI is displayed, the method may include constructing the influence region of the target POI on the target electronic map displayed at the preset scale, to provide data basis for determining a position relationship for a subsequently updated POI, and avoid the POI displayed this time from being covered or collided.

This embodiment creatively proposes the influence region of the POI for guiding display situations of the target POI. With determining the position relationship between the display position of the target POI and the influence region of each POI on the target electronic map, a result whether the target POI is suitable for being displayed on the target electronic map in the visual effect is obtained. When the display position of the target POI is outside the influence region of each POI on the target electronic map, it means that the target POI may not produce the negatively influence, such as covering or colliding, on the currently displayed POI, thereby directly displaying the information of the target POI at the display position of the target electronic map. The method provided by this embodiment may avoid the target POI overlapping its surrounding POIs and ensure overall display effect. In this embodiment, with determining the position relationships between the target POI and the influence regions of other POIs, the information of the target POI may be automatically displayed, without rearranging and displaying all POIs, thereby improving update efficiency and intelligence degree, avoiding the target POI overlapping its surrounding POIs, and ensuring the overall display effect.

Figure 2A:
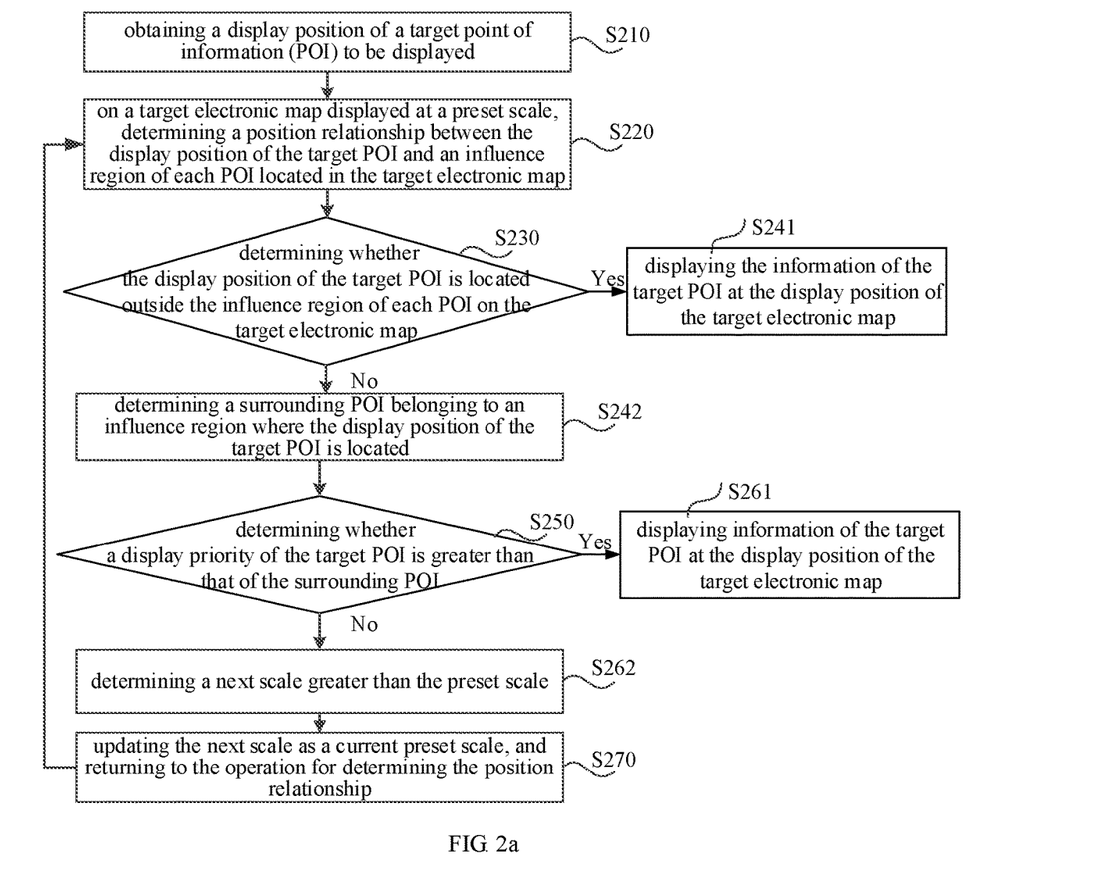
FIG. 2a is a flow chart illustrating a method for displaying a point of information of a map according to a second embodiment of the disclosure.

According to embodiments of the disclosure, FIG. 2a is a flow chart illustrating a method for displaying a point of information of a map according to a second embodiment of the disclosure. Embodiments of the disclosure are further described on the basis of the technical solution of the above embodiment.

In some embodiments, after the action "after determining the position relationship between the display position of the target POI and the influence region of each POI on the target electronic map", the action "determining a surrounding POI belonging to an influence region where the display position of the target POI is located in response to the display position of the target POI being located within the influence region of any POI on the target electronic map; and displaying the information of the target POI at the display position of the target electronic map in response to a display priority of the target POI being greater than that of the surrounding POI" is performed.

In some embodiments, after the action "determining the position relationship between the display position of the target POI and the influence region of each POI located on the target electronic map", the action "determining a next scale greater than the preset scale in response to the display priority of the target POI being lower than that of the surrounding POI; and updating the next scale as a current preset scale, and returning to the operation for determining the position relationship" is performed.

The method for displaying the point of information of the map illustrated in FIG. 2a includes the followings.

At block S210, a display position of a target point of information (POI) to be displayed is obtained.

At block S220, on a target electronic map displayed at a preset scale, a position relationship between the display position of the target POI and an influence region of each POI located on the target electronic map is determined.

At block S230, whether the display position of the target POI is located outside the influence region of each POI on the target electronic map is determined. If yes, the action at block S241 is performed; otherwise, that is, the display position of the target POI is located within the influence region of any POI on the target electronic map, the action at block S242 is performed.

At block S241, the information of the target POI is displayed at the display position of the target electronic map. The action at block S241 ends.

At block S242, a surrounding POI belonging to an influence region where the display position of the target POI is located is determined.

When the display position of the target POI is located within the influence region of any POI on the target electronic map, it is considered that the target POI may cover or collide with the POI belonging to the influence region. For convenience of description and distinction, the POI belonging to the influence region where the display position is located is called the surrounding POI.

In some embodiments, the number of influence regions where the display position is located is at least one. Correspondingly, the number of surrounding POIs is also at least one.

At block S250, whether the display priority of the target POI is higher than that of the surrounding POI is determined. If yes, the action at block S261 is performed; otherwise, the action at block S262 is performed.

When the target POI may cover or collide with any POI belonging to the influence region, it is required to determine whether the information of the target POI is displayed on the target electronic map based on the display priorities.

In some embodiments, different types of POIs have different display priorities. For example, a display priority of a POI providing social services is greater than that of a POI providing private services. A POI with a higher display priority is first displayed on the target electronic map.

In some embodiments, when the number of surrounding POIs is at least two, the display priority of the target POI requires to compare with all surrounding POIs. When the display priority of the target POI is higher than that of each of all the surrounding POIs, the action at block S261 is performed. When the display priority of the target POI is lower than that of any surrounding POI, the action at block S262 is performed.

At block S261, the information of the target POI is displayed at the display position of the target electronic map. The action at block S261 is ends.

When the display priority of the target POI is greater than that of each of all the surrounding POIs, even if the target POI may cover or collide with the surrounding POIs, the information of the target POI may still be displayed at the display position, thereby ensuring that the target POI may be displayed on the target electronic map at a smaller scale and is convenient for users to use.

Further, information of the surrounding POI is weakened, for example, reducing information amount of the surrounding POI and retaining only a name of the surrounding POI; or reducing a display font size of the surrounding POI; or blurring the information of the surrounding POI.

At block S262, a next scale greater than the preset scale is determined.

At block S270, the next scale is updated as a current preset scale, and the action at block S220 is returned.

When the display position of the target POI is within the influence region of the POI (i.e., surrounding POI) in the target electronic map, and the display priority is lower than that of the surrounding POI, it means that the target POI is not suitable for being displayed on the target electronic map. Then an electronic map displayed at the next scale is scanned.

The next scale is greater than the preset scale, a display accuracy is finer, and a distance between the surrounding POI and the target POI on the electronic map may be farther. Then, there may be enough space to display the information of the target POI without affecting the surrounding POI in visual effect.

In some embodiments, in order to ensure that the target POI may not affect the surrounding POIs at any preset scale, a range of the influence region of each POI (including the surrounding POI) is determined based on the preset scale. In detail, the larger the preset scale, the smaller the range of the influence region. For example, the preset scale is 1 m:1000 m, and the range of the influence region is 500 m. The preset scale is 1 m:200 m, and the range of the influence region is 5 m. Therefore, every time the target electronic map is displayed at the preset scale, the influence region of each POI is determined based on the current preset scale, and then the position relationship between the display position of the target POI and the influence region of each POI is determined.

Figure 2B:
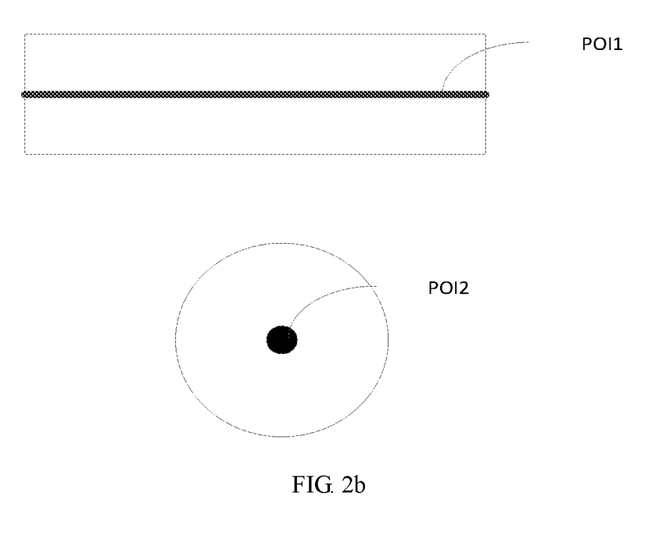
FIG. 2b is a schematic diagram illustrating an influence region of a PIO according to embodiments of the disclosure.

In some embodiments, a shape of the influence region of each POI is determined based on a display shape of the POI. FIG. 2b is a schematic diagram illustrating an influence region of a PIO according to embodiments of the disclosure. POI1 is a road, and a display shape of the POI1 is a line, so the shape of the influence region of the POI1 is a rectangle formed by taking the line as a center axis and extending to both sides of the line in vertical directions of the line, and a length extended to each side is the range of the influence region of the POI1. POI2 is a building, such as a library or a hospital. When the display shape of the POI2 is a point, the shape of the influence region is a circle formed by taking the point as a center and extending to surrounding, and a length extending to surrounding is the range of the influence region of the POI2.

In this embodiment, with determining the shape of the influence region based on the display shape of the POI, the shape of the influence region is more consistent with the actual situation in the visual effect, such that the target POI may be displayed on the electronic map with the visual effect close to the actual situation.

In some embodiments, when the current preset scale is a maximum scale at which the electronic map may be displayed, the action at block S207 is ended, and the target POI may not be displayed on the electronic map.

In embodiments, the next greater scale is determined when the display priority of the target POI is lower. A position relationship between the display position of the target POI and the influence region of each POI on the target electronic map displayed at the next greater scale is determined. In this way, a smallest scale suitable for display the target POI may be found, and the target POI may be easily found by the users.

In the above embodiments and following embodiments, the preset scale is determined based on a business requirement or an attribute of the target POI. The attribute includes at least one of: a type, search popularity, an area and a frontage attribute.

It should be noted that, the preset scale is a scale at which the electronic map is displayed when the position relationship between the display position of the target POI and the influence region of each POI on the target electronic map is determined for the first time, instead of the newly preset scale determined after subsequently updating.

In detail, the business requirement is a scale given by a provider of the target POI and requiring the target POI to be displayed at which. When the business requirement may not be met, that is, the target POI is not suitable for being displayed on the electronic map displayed at the preset scale (see the above embodiment for details, the display position of the target POI is within the influence region of any POI in the target electronic map, and the display priority of the target POI is lower than that of any surrounding POI), the next greater scale is scanned continuously to complete a task for displaying the target POI.

In this embodiment, the preset scale may be first determined based on the business requirement, such that the scale of the business requirement may be first met when the target POI is displayed.

In absence of the business requirement, the preset scale may be determined based on the attribute of the target POI. When the type of the target POI is a type of providing social services, the search popularity of the target POI is high, the area of the target POI is large, or the target POI has the frontage attribute, the preset scale may be smaller. When the type of the target POI is a type of providing private services, the search popularity of the target POI is low, the area of the target POI is small, or the target POI has no frontage attribute, the preset scale may be greater.

In embodiments, the preset scale is determined based on the attribute of the target POI, without first determining the minimum scale, thereby facilitating to display the target POI at an appropriate scale, and improving the display efficiency of the target POI.

Figure 3:
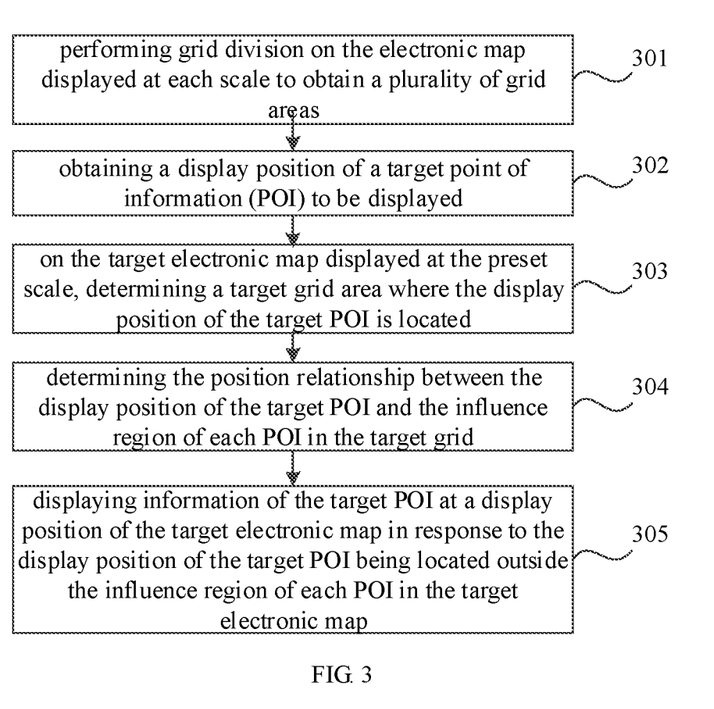
FIG. 3 is a flow chart illustrating a method for displaying a point of information of a map according to a third embodiment of the disclosure.

According to embodiments of the disclosure, FIG. 3 is a flow chart illustrating a method for displaying a point of information of a map according to a third embodiment of the disclosure. Embodiments describe the process of determining the positional relationship on the basis of the above embodiments.

The method for displaying the point of information of the map illustrated in FIG. 3 includes the followings.

At block S310, grid division is performed on the electronic map displayed at each scale to obtain multiple grid regions.

A size for performing the grid division on the electronic map may be determined based on the scale. The smaller the scale, the greater the size for performing the grid division is. The grid division is performed on the electronic map displayed at each scale to obtain multiple groups of grid regions corresponding to each scale. Each group of grid regions includes multiple grid regions.

At block S320, a display position of a target POI to be displayed is obtained.

At block S330, on the target electronic map displayed at the preset scale, a target grid region where the display position of the target POI is located is determined.

Each grid region is marked with coordinates of corner points of the grid region. The target grid region on the target electronic map where the display position of the target POI is located is determined based on the coordinates of corner points of each grid region.

At block S340, the position relationship between the display position of the target POI and the influence region of each POI in the target grid region is determined.

In this embodiment, in a progress of determining the positional relationship, the display position of the target POI merely requires to be compared with the influence region of each POI in the target grid region, instead of comparing the display position of the target POI with the influence region of all POIs displayed on the target electronic map, thereby reducing the number of POIs to be compared, which facilitates to reduce computing amount and improving the display efficiency of the target POI.

At block S350, information of the target POI is displayed at a display position of the target electronic map in response to the display position of the target POI being located outside the influence region of each POI in the target electronic map.

In the above embodiments, before obtaining the display position of the target POI to be displayed, the method also includes: removing information of the target POI displayed at a historical display position and an influence region of the historical display position.

This embodiment is applicable to a scene where the POI is updated. Before the target POI is newly added on the target electronic map, the information of the target POI displayed at the historical display position requires to be removed, and the influence region of the historical display position also requires to be removed.

Exemplarily, the historical display position of the target POI is a wayside of road A, and an updated display position of the target POI is a wayside of road B. Then, the information of the target POI at the wayside of the road A and the influence region of the target POI at the wayside of the road A are removed.

Figure 4:
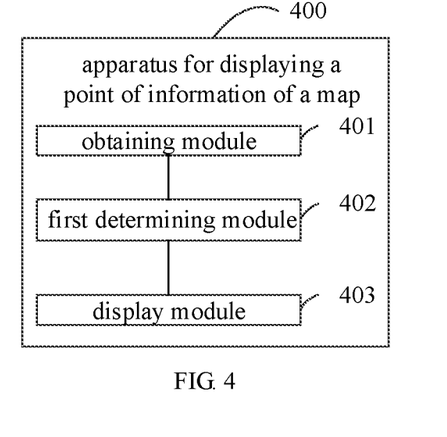
FIG. 4 is a block diagram illustrating an apparatus for displaying a point of information of a map according to embodiments of the disclosure.

In embodiments, the historical display position and the influence region of the target POI are removed firstly, and then the updated display position of the target POI is added to the target electronic map, thereby implementing to update the target POI. When the target POI is updated, the updating efficiency and the updating intelligence are improved, and the POI overlapping with its surrounding POIs is avoided, and the overall display effect is ensured According to embodiments of the disclosure, FIG. 4 is a block diagram illustrating an apparatus for displaying a point of information of a map according to embodiments of the disclosure. Embodiments of the disclosure are suitable a condition where a newly added or updated POI is displayed in an electronic map. The apparatus is implemented by software and/or hardware, and is specifically configured in an electronic device with a certain data operation ability.

The apparatus 400 for displaying the point of information of the map illustrated in FIG. 4 includes: an obtaining module 401, a first determining module 402, and a display module 403.

The obtaining module 401 is configured to obtain a display position of a target point of information (POI) to be displayed. The first determining module 402 is configured to, on a target electronic map displayed at a preset scale, determine a position relationship between the display position of the target POI and an influence region of each POI located in the target electronic map. The display module 403 is configured to display information of the target POI at the display position of the target electronic map in response to the display position of the target POI being located outside the influence region of each POI in the target electronic map.

This embodiment creatively proposes the influence region of the POI for guiding the display of the target POI. By determining the position relationship between the display position of the target POI and the influence region of each POI in the target electronic map, a result whether the target POI is suitable for being displayed on the target electronic map in visual effect is obtained. When the display position of the target POI is outside the influence region of each POI in the target electronic map, it means that the target POI may not cover or collide with the currently displayed POI, thereby directly displaying the information of the target POI at the display position of the target electronic map. The method provided by this embodiment may improve overlapping between the POI and its surrounding POI and ensure the overall display effect. With this embodiment, by comparing the position relationship between the target POI and the influence regions of other POIs, the information of the target POI may be automatically displayed, without rearranging and displaying all POIs, thereby improving the update efficiency and intelligence, improving the overlapping between the POI and its surrounding POI, and ensuring the overall display effect.

In some embodiments, the apparatus also includes: a second determining module and a POI display module. The second determining module is configured to determine a surrounding POI belonging to an influence region where the display position of the target POI is located in response to the display position of the target POI being located within the influence region of the POI in the target electronic map. The POI display module is configured to display the information of the target POI at the display position of the target electronic map in response to a display priority of the target POI being greater than that of the surrounding POI.

In some embodiments, the apparatus also includes: a third determining module and an updating module. The third determining module is configured to determine a next scale greater than the preset scale in response to the display priority of the target POI being lower than that of the surrounding POI. The updating module is configured to update the next scale to a current preset scale, and returning to the operation for determining the position relationship.

In some embodiments, the preset scale is determined based on a business requirement or an attribute of the target POI; and the attribute includes at least one of: a type, search popularity, an area and a frontage attribute.

In some embodiments, the apparatus also includes a grid division module. The grid division module is configured to perform grid division on the electronic map displayed at each scale to obtain a plurality of grid regions. The determining module 402 is configured to: on the target electronic map displayed at the preset scale, determine a target grid region where the display position of the target POI is located; and determine the position relationship between the display position of the target POI and the influence region of each POI in the target grid region.

In some embodiments, a range of the influence region of each POI is determined based on the preset scale; and a shape of the influence region of each POI is determined based on a display shape of the POI.

In some embodiments, the apparatus also includes: a removing module. The removing module is configured to remove information of the target POI displayed at a historical display position and an influence region of the historical display position.

The above apparatus for displaying the point of information of the map may execute the method for displaying the point of information of the map according to any one of embodiments of the disclosure, and has corresponding beneficial effects and functional modules for executing the method for displaying the point of information of the map.

According to embodiments of the disclosure, the disclosure also provides an electronic device and a readable storage medium.

Figure 5:
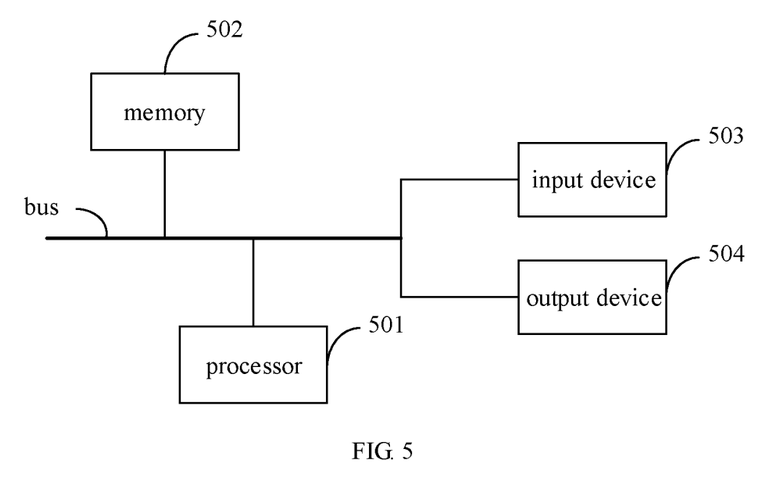
FIG. 5 is a block diagram illustrating an electronic device according to embodiments of the disclosure.

As illustrated in FIG. 5, FIG. 5 is a block diagram illustrating an electronic device according to embodiments of the disclosure. The electronic device aims to represent various forms of digital computers, such as a laptop computer, a desktop computer, a workstation, a personal digital assistant, a server, a blade server, a mainframe computer and other suitable computer. The electronic device may also represent various forms of mobile devices, such as personal digital processing, a cellular phone, a smart phone, a wearable device and other similar computing device. The components, connections and relationships of the components, and functions of the components illustrated herein are merely examples, and are not intended to limit the implementation of the disclosure described and/or claimed herein.

As illustrated in FIG. 5, the electronic device includes: one or more processors 501, a memory 502, and interfaces for connecting various components, including a high-speed interface and a low-speed interface. Various components are connected to each other via different buses, and may be mounted on a common main board or in other ways as required. The processor may process instructions executed within the electronic device, including instructions stored in or on the memory to display graphical information of the GUI (graphical user interface) on an external input/output device (such as a display device coupled to an interface). In other implementations, multiple processors and/or multiple buses may be used together with multiple memories if desired. Similarly, multiple electronic devices may be connected, and each device provides some necessary operations (for example, as a server array, a group of blade servers, or a multiprocessor system). In FIG. 5, a processor 501 is taken as an example.

The memory 502 is a non-transitory computer readable storage medium provided by the disclosure. The memory is configured to store instructions executable by at least one processor, to enable the at least one processor to execute the method for displaying the point of information of the map provided by the disclosure. The non-transitory computer readable storage medium provided by the disclosure is configured to store computer instructions. The computer instructions are configured to enable a computer to execute the method for displaying the point of information of the map provided by the disclosure.

As the non-transitory computer readable storage medium, the memory 502 may be configured to store non-transitory software programs, non-transitory computer executable programs and modules, such as program instructions/module (such as the obtaining module 401, the first determining module 402, and the display module 403 illustrated in FIG. 4) corresponding to the method for displaying the point of information of the map according to embodiments of the disclosure. The processor 501 is configured to execute various functional applications and data processing of the server by operating non-transitory software programs, instructions and modules stored in the memory 502, that is, implements the method for displaying the point of information of the map according to the above method embodiments.

The memory 502 may include a storage program region and a storage data region. The storage program region may store an application required by an operating system and at least one function. The storage data region may store data created according to predicted usage of the electronic device capable of implementing the method for displaying the point of information of the map based on the semantic representation. In addition, the memory 502 may include a high-speed random access memory, and may also include a non-transitory memory, such as at least one disk memory device, a flash memory device, or other non-transitory solid-state memory device. In some embodiments, the memory 502 may optionally include memories remotely located to the processor 501, and these remote memories may be connected to the electronic device via a network. Examples of the above network include, but are not limited to, an Internet, an intranet, a local area network, a mobile communication network and combinations thereof.

The electronic device capable of implementing the method for displaying the point of information of the map may also include: an input device 503 and an output device 504. The processor 501, the memory 502, the input device 503, and the output device 504 may be connected via a bus or in other means. In FIG. 5, the bus is taken as an example.

The input device 503 may receive inputted digital or character information, and generate key signal input related to user setting and function control of the electronic device, such as a touch screen, a keypad, a mouse, a track pad, a touch pad, an indicator stick, one or more mouse buttons, a trackball, a joystick and other input device. The output device 504 may include a display device, an auxiliary lighting device (e.g., LED), a haptic feedback device (e.g., a vibration motor), and the like. The display device may include, but be not limited to, a liquid crystal display (LCD), a light emitting diode (LED) display, and a plasma display. In some embodiments, the display device may be the touch screen.

The various implementations of the system and technologies described herein may be implemented in a digital electronic circuit system, an integrated circuit system, an application specific ASIC (application specific integrated circuit), a computer hardware, a firmware, a software, and/or combinations thereof. These various implementations may include: being implemented in one or more computer programs. The one or more computer programs may be executed and/or interpreted on a programmable system including at least one programmable processor. The programmable processor may be a special purpose or general purpose programmable processor, may receive data and instructions from a storage system, at least one input device, and at least one output device, and may transmit data and the instructions to the storage system, the at least one input device, and the at least one output device.

These computing programs (also called programs, software, software applications, or codes) include machine instructions of programmable processors, and may be implemented by utilizing high-level procedures and/or object-oriented programming languages, and/or assembly/machine languages. As used herein, the terms "machine readable medium" and "computer readable medium" refer to any computer program product, device, and/or apparatus (such as, a magnetic disk, an optical disk, a memory, a programmable logic device (PLD)) for providing machine instructions and/or data to a programmable processor, including a machine readable medium that receives machine instructions as a machine readable signal. The term "machine readable signal" refers to any signal for providing the machine instructions and/or data to the programmable processor.

To provide interaction with a user, the system and technologies described herein may be implemented on a computer. The computer has a display device (such as, a CRT (cathode ray tube) or a LCD (liquid crystal display) monitor) for displaying information to the user, a keyboard and a pointing device (such as, a mouse or a trackball), through which the user may provide the input to the computer. Other types of devices may also be configured to provide interaction with the user. For example, the feedback provided to the user may be any form of sensory feedback (such as, visual feedback, auditory feedback, or tactile feedback), and the input from the user may be received in any form (including acoustic input, voice input or tactile input).

The system and technologies described herein may be implemented in a computing system including a background component (such as, a data server), a computing system including a middleware component (such as, an application server), or a computing system including a front-end component (such as, a user computer having a graphical user interface or a web browser through which the user may interact with embodiments of the system and technologies described herein), or a computing system including any combination of such background component, the middleware components and the front-end component. Components of the system may be connected to each other via digital data communication in any form or medium (such as, a communication network). Examples of the communication network include a local area network (LAN), a wide area networks (WAN), and the Internet.

The computer system may include a client and a server. The client and the server are generally remote from each other and generally interact via the communication network. A relationship between the client and the server is generated by computer programs operated on a corresponding computer and having a client-server relationship with each other. The server may be a cloud server, also known as cloud computing server or a cloud host, which is a host product in a cloud computing service system, to solve the defects of difficult management and weak business scalability in a traditional physical host and a VPS service.

It should be understood that, steps may be reordered, added or deleted by utilizing flows in the various forms illustrated above. For example, the steps described in the disclosure may be executed in parallel, sequentially or in different orders, so long as desired results of the technical solution disclosed in the disclosure may be achieved, there is no limitation here.

The above detailed implementations do not limit the protection scope of the disclosure. It should be understood by the skilled in the art that various modifications, combinations, sub-combinations and substitutions may be made based on design requirements and other factors. Any modification, equivalent substitution and improvement made within the spirit and the principle of the disclosure shall be included in the protection scope of disclosure.

What is claimed is:

1. A method for displaying a point of information of a map, comprising:
    obtaining a display position of a target point of information (POI) to be displayed;
    on a target electronic map displayed at a preset scale, determining a position relationship between the display position of the target POI and an influence region of each POI located in the target electronic map; and
    displaying information of the target POI at the display position of the target electronic map in response to the display position of the target POI being located outside the influence region of each POI in the target electronic map;
    wherein after determining the position relationship between the display position of the target POI and the influence region of each POI in the target electronic map, further comprising:
    determining a surrounding POI belonging to an influence region where the display position of the target POI is located in response to the display position of the target POI being located within the influence region of any POI in the target electronic map; and
    in response to a display priority of the target POI being greater than that of the surrounding POI, displaying the information of the target POI at the display position of the target electronic map;
    after determining the position relationship between the display position of the target POI and the influence region of each POI located in the target electronic map, further comprising:
    determining a next scale greater than the preset scale in response to the display priority of the target POI being lower than that of the surrounding POI; and
    updating the next scale as a current preset scale, and returning to the operation for determining the position relationship.

2. The method of claim 1, wherein the preset scale is determined based on a business requirement or an attribute of the target POI; and the attribute comprises at least one of: a type, search popularity, an area and a frontage attribute.

3. The method of claim 1, before determining the position relationship between the display position of the target POI and the influence region of each POI located in the target electronic map, further comprising:

performing grid division on the electronic map displayed at each scale to obtain a plurality of grid regions; and determining the position relationship between the display position of the target POI and the influence region of each POI located on the target electronic map comprises:

on the target electronic map displayed at the preset scale, determining a target grid region where the display position of the target POI is located; and determining the position relationship between the display position of the target POI and the influence region of each POI in the target grid region.

4. The method of claim 1, wherein a range of the influence region of each POI is determined based on the preset scale; and a shape of the influence region of each POI is determined based on a display shape of the POI.

5. The method of claim 1, before obtaining the display position of the target POI to be displayed, further comprising:

removing information of the target POI displayed at a historical display position and an influence region of the historical display position.

6. An electronic device, comprising:
at least one processor; and
a memory, communicatively coupled to the at least one processor,
wherein the memory is configured to store instructions executable by the at least one processor, and the at least one processor is configured to:
obtain a display position of a target point of information (POI) to be displayed;
on a target electronic map displayed at a preset scale, determine a position relationship between the display position of the target POI and an influence region of each POI located in the target electronic map; and
display information of the target POI at the display position of the target electronic map in response to the display position of the target POI being located outside the influence region of each POI in the target electronic map;
wherein, the at least one processor is further configured to:
after determining the position relationship between the display position of the target POI and the influence region of each POI in the target electronic map, determine a surrounding POI belonging to an influence region where the display position of the target POI is located in response to the display position of the target POI being located within the influence region of any POI in the target electronic map; and in response to a display priority of the target POI being greater than that of the surrounding POI, display the information of the target POI at the display position of the target electronic map;
wherein, the at least one processor is further configured to: after determining the position relationship between the display position of the target POI and the influence region of each POI located in the target electronic map, determine a next scale greater than the preset scale in response to the display priority of the target POI being lower than that of the surrounding POI; and update the next scale as a current preset scale, and return to the operation for determining the position relationship.

7. The electronic device of claim 6, wherein the preset scale is determined based on a business requirement or an attribute of the target POI; and
the attribute comprises at least one of: a type, search popularity, an area and a frontage attribute.

8. The electronic device of claim 6, wherein, the at least one processor is further configured to:
before determining the position relationship between the display position of the target POI and the influence region of each POI located in the target electronic map, perform grid division on the electronic map displayed at each scale to obtain a plurality of grid regions; and
on the target electronic map displayed at the preset scale, determine a target grid region where the display position of the target POI is located; and determine the position relationship between the display position of the target POI and the influence region of each POI in the target grid region.

9. The electronic device of claim 6, wherein a range of the influence region of each POI is determined based on the preset scale; and a shape of the influence region of each POI is determined based on a display shape of the POI.

10. The electronic device of claim 6, wherein, the at least one processor is further configured to: before obtaining the display position of the target POI to be displayed, remove information of the target POI displayed at a historical display position and an influence region of the historical display position.

11. A non-transitory computer readable storage medium having computer instructions stored thereon, wherein the computer instructions are configured to cause a computer to execute a method for displaying a point of information of a map, and the method comprises:
obtaining a display position of a target point of information (POI) to be displayed;
on a target electronic map displayed at a preset scale, determining a position relationship between the display position of the target POI and an influence region of each POI located in the target electronic map; and
displaying information of the target POI at the display position of the target electronic map in response to the display position of the target POI being located outside the influence region of each POI in the target electronic map;
wherein after determining the position relationship between the display position of the target POI and the influence region of each POI in the target electronic map, further comprising:
determining a surrounding POI belonging to an influence region where the display position of the target POI is located in response to the display position of the target POI being located within the influence region of any POI in the target electronic map; and
in response to a display priority of the target POI being greater than that of the surrounding POI, displaying the information of the target POI at the display position of the target electronic map;
after determining the position relationship between the display position of the target POI and the influence region of each POI located in the target electronic map, further comprising:

determining a next scale greater than the preset scale in response to the display priority of the target POI being lower than that of the surrounding POI; and updating the next scale as a current preset scale, and returning to the operation for determining the position relationship.

12. The storage medium of claim 11, wherein the preset scale is determined based on a business requirement or an attribute of the target POI; and the attribute comprises at least one of: a type, search popularity, an area and a frontage attribute.

13. The storage medium of claim 11, before determining the position relationship between the display position of the target POI and the influence region of each POI located in the target electronic map, further comprising:

performing grid division on the electronic map displayed at each scale to obtain a plurality of grid regions; and determining the position relationship between the display position of the target POI and the influence region of each POI located on the target electronic map comprises:

on the target electronic map displayed at the preset scale, determining a target grid region where the display position of the target POI is located; and determining the position relationship between the display position of the target POI and the influence region of each POI in the target grid region.

14. The storage medium of claim 11, wherein a range of the influence region of each POI is determined based on the preset scale; and a shape of the influence region of each POI is determined based on a display shape of the POI.

* * * * *